(12) United States Patent
Steinmetz et al.

(10) Patent No.: US 7,719,422 B1
(45) Date of Patent: May 18, 2010

(54) WIRELESS INTERNET PROTOCOL-BASED ACTION-ORIENTED SYSTEM FOR REMOTE WIRELESS ALERTING AND ACTION

(76) Inventors: Jay Steinmetz, 213 Paddington Road, Baltimore, MD (US) 21212-3438; Lawrence Cuthie, 6 Musket Ct., Parkton, MD (US) 21120

( * ) Notice: Subject to any disclaimer, the term of this patent is extended or adjusted under 35 U.S.C. 154(b) by 307 days.

(21) Appl. No.: 11/897,357

(22) Filed: Aug. 30, 2007

Related U.S. Application Data (60) Provisional application No. 60/841,179, filed on Aug. 30, 2006.

(51) Int. Cl.
*G08B 13/14* (2006.01)
(52) U.S. Cl. ............... 340/572.1; 340/10.1; 340/5.31
(58) Field of Classification Search ............. 340/572.1
See application file for complete search history.

(56) References Cited

U.S. PATENT DOCUMENTS

| | | | | |
|---|---|---|---|---|
| 5,025,175 | A * | 6/1991 | Dubois, III | 307/326 |
| 6,177,860 | B1 * | 1/2001 | Cromer et al. | 340/10.1 |
| 6,437,692 | B1 * | 8/2002 | Petite et al. | 340/540 |
| 7,323,991 | B1 * | 1/2008 | Eckert et al. | 340/572.1 |
| 2002/0027504 | A1 * | 3/2002 | Davis et al. | 340/540 |
| 2003/0107485 | A1 * | 6/2003 | Zoratti | 340/568.1 |
| 2004/0155533 | A1 * | 8/2004 | Poser | 307/326 |
| 2005/0190056 | A1 * | 9/2005 | Lacy et al. | 340/539.11 |
| 2005/0284939 | A1 * | 12/2005 | Bright et al. | 235/451 |
| 2007/0205861 | A1 * | 9/2007 | Nair et al. | 340/5.61 |

* cited by examiner

*Primary Examiner*—Benjamin C Lee
*Assistant Examiner*—Curtis J King
(74) *Attorney, Agent, or Firm*—Townsend & Banta (57) ABSTRACT

The present invention provides a wireless internet protocol-based action-oriented system comprising an actuator, which may be worn on or carried by a user, and which may be activated by the user to wirelessly communicate, via an access point on a LAN, a signal to a base station server to execute an action command, such as a stoppage of nearby associated machinery or vehicles. Alternatively, sensors and/or detectors disposed on the actuator may independently transmit data to the base station server, which the base station server may then act upon. The system further includes a computer software program product, which links the actuator, access points, base station server and associated machinery and/or vehicles, and which allows the base station server to communicate with a corresponding machine or vehicle to order an execution of an action thereby. The system may further have a barcode scanner in communication with the base station server, and each actuator may further contain a barcode or unique identification number, such that actuator data may be entered into the base station server with ease and active controls set on the actuator. Thus, the actuator, in conjunction with the system and corresponding computer program product, allows a user to have the ability to immediately initiate a remote action, such as the halting of operation of industrial equipment or vehicles in communication with the system of the present invention operating over a wireless LAN, and allows system managers to easily set controls associated with each actuator.

12 Claims, 2 Drawing Sheets

WIRELESS INTERNET PROTOCOL-BASED ACTION-ORIENTED SYSTEM FOR REMOTE WIRELESS ALERTING AND ACTION

This application is a corresponding non-provisional application claiming the benefit of priori filed U.S. provisional application Ser. No. 60/841,179, filed Aug. 30, 2007, the contents of which are incorporated herein by reference.

FIELD OF THE INVENTION

The present invention provides a wireless interne protocol-based action-oriented system comprising a remote actuator having an active RFID tag, which may be worn or carried by a user, and which may be passively activated by a sensor/detector, or actively activated by the user, to wirelessly communicate a signal to a central server on a wireless network. The central server is operable to subsequently initiate an assigned action stored on the central server, including communicating warnings to system users and command to machinery in communication with the central server.

BACKGROUND OF THE INVENTION

Single action user-initiated action devices have been previously used for applications such as work stoppage devices. Such work stoppage devices have been provided, for example, to allow a user to depress a button or activate a switch to permanently or temporarily cease operation of an industrial machine. These work stoppage devices are traditionally fixed mounted to the industrial machines they are designed to control, but in some instances are movable.

Usage of these work stoppage devices, however, requires the individual witnessing or involved in an industrial machine-related accident to attempt to terminate the activity of the industrial machine involved by running to or reaching for the fixed mounted or movable work stoppage device. This required physical movement of the user or witness effectively eliminates a remote witness from activating the device in a timely manner, and potentially delays the deactivation by the user of the industrial machine involved. Further, the necessity to physically activate a remotely located device may also potentially lead to further injury of the user if, for example, the user is trapped in the machinery.

In another conventional application of a single action user-initiated action device, a wireless warning device has been provided, mainly for senior citizens or disabled persons, which allows the user to activate same by depressing a button thereon. When activated, the device calls an emergency medical team to assist the user. Further, a device has been built by Symbol Technologies™ as a stationary button, acting as a "kanban" or flag, to send a signal to a central location to notify same that parts are needed in a specific area. However, these conventional devices fail to address the problem of geographical monitoring of a user, and wireless single action initiation of an action by a user, as is needed in many industrial facilities.

In view of the deficiencies of the conventional devices and systems for emergency notification, as discussed above, it is an object of the present invention to provide a wireless internet protocol-based action-oriented actuator, and system containing same, to allow a user to remotely notify a central location/computer processing means of a current or impending emergency situation. The central location/computer processing means will, subsequently, wirelessly communicate with associated machines and/or vehicles to request initiation of preassigned actions.

It is a further object of the present invention to provide a computer software program product for use in the actuator and system described above, to achieve the above-mentioned actions.

It is yet a further object of the present invention to provide each actuator in the system with a barcode or unique identification number which base station computer application program code may be operable to associate the barcode or unique identification number of each individual actuator with the active RFID tag of each individual actuator.

SUMMARY OF THE INVENTION

In order to achieve the above mentioned objects, the present inventors earnestly endeavored to provide an improved system for wireless internet protocol-based action, a computer program product used therein, and a method for wirelessly alerting/communicating with a central location/computer processing means, so as to initiate a preassigned action. Accordingly, in a first embodiment of the present invention, a wireless internet protocol-based action-oriented system is provided, comprising:

(1) one or more internet protocol-based action orientated actuators, each actuator comprising:
 (a) an active RFID tag operable to transmit a MAC address on a wireless network;
 (b) an actuator computer processing means in communication with the active RFID tag;
 (b) a user alert initiation means in communication with the active RFID tag and the actuator computer processing means, so as to allow communication of an action initiation command by a user to the actuator computer processing means;
 (c) an actuator wireless communication means in communication with the active RFID tag;
 (d) one or more sensors/detectors operable to detect/measure physical and/or biological parameters; and
 (e) a trigger to initiate communications with the actuator based on the detected/measured physical and/or biological parameters;

(2) one or more system access points in wireless communication with one or more of the actuators, each of said access points comprising:
 (a) an access point computer processing means;
 (b) an access point wireless communication means;

(3) one or more location-based addressable IP central base station servers, each of said base stations in communication, via wireless LAN, with one or more of the access points, each of said base station servers comprising:
 (a) a base station computer processing means;
 (b) a computer storage means in communication with the base station computer processing means; and
 (c) a base station wireless communication means which is in communication with the base station computer processing means, and which is capable of enabling wireless communication of the base station server with one or more of the access points and associated machinery and/or vehicles comprising programmable logic controllers;

(4) an actuator computer application program product operable to run on the actuator computer processing means, in conjunction with a conventional operating system, comprising:
 (a) computer application program code operable to communicate an action initiation command from the user alert initiation means to the active RFID tag; and (b) computer application program code operable to enable the active RFID tag to communicate an action initiation command to the base station computer processing means by transmitting a Boolean value to the base station;

(5) a base station computer application program product operable to run on the base station computer processing means, in conjunction with a conventional operating system, comprising:

(a) computer application program code operable to enable reception of the action initiation command from the access point associated with the user's actuator, and transmit same to the base station computer processing means;

(b) computer application program code operable to enable the base station computer processing means to determine the identification of the active RFID tag of the actuator and/or physical location of the actuator, based on the location of the actuator on the wireless LAN;

(c) computer application program code operable to determine associated machinery and/or vehicles, based on the identified active RFID tag and/or the determined physical location of the actuator;

(d) computer application program code operable to query a cache of action initiation data, stored on the base station computer storage means, corresponding to the machinery and/or vehicles associated with the active RFID tag or the location of the actuator, to determine one or more appropriate action initiation commands associated with the determined associated machinery and/or vehicles;

(e) computer application program code operable to enable the base station computer processing means to communicate, via the base station wireless communication means, the action initiation commands to the associated machinery and/or vehicles; and (f) computer application program code operable to provide a user interface means to enable observation of system conditions, and select active controls (actions to be initiated) for specific actuators.

In a second embodiment of the present invention, the wireless internet protocol-based action-oriented system of the first embodiment above is provided, wherein:

the actuator further comprises a barcode or a unique identification number, and the base station computer application program product further comprises computer application program code operable to associate the barcode or unique identification number of each actuator with the active RFID tag of each actuator.

In a third embodiment of the present invention, the wireless internet protocol-based action-oriented system of the second embodiment above is provided, further comprising:

a barcode scanner in communication with the base station computer processing means, the barcode scanner being operable to input barcode data associated with the barcode of each individual actuator into the base station computer program product.

In particular, the remote actuator may be quickly associated to an asset (such as machinery) or person by utilizing near field or contact association. This is achieved by first associating a barcode with the active RFID contained in the actuator, and scanning the barcode associated with the active RFID tag contained within the actuator, so as to input the barcode and associated active RFID into the base station computer storage means, as described in the third embodiment above. Then, the barcode and active RFID to a user via the base station computer processing means.

In a fourth embodiment of the present invention, the wireless internet protocol-based action-oriented system of the second embodiment above is provided, wherein the actuator is auto-programmable via passive RFID or near field RFID technology. This passive RFID tag may be embedded into the actuator.

In a fifth embodiment of the present invention, the wireless internet protocol-based action-oriented system of the first embodiment above is provided, wherein the sensors/detectors comprise one or more of a motion detector, infrared (IR) distance sensor, light sensor (light meter), radioactivity detector/sensor, chemical sensor, physiological parameter sensor, biometric sensor, bioagent detectors, altimeter, air speed indicator, air pressure sensor, olfactory sensor, and acoustic detector.

The sensors/detectors are operable to communicate physical and/or biological data to the actuator computer processing means, which then communicates said data (or variations thereof) to the base station computer processing means. The base station computer processing means is operable to initiate a warning or communication to preselected individuals, and/or communicate commands to machinery associated with the actuator from which the data was received, based on the data communicated from the sensors/detectors.

Importantly, when utilizing any sensor/detector provided by the present invention, the base station computer processing means receives data from the actuator provided by the sensor/detector, and then queries the cache of action initiation data to determine an appropriate response (such as an action initiation command, or the decision to take no action) based on the data received from the sensor/detector. Exemplary action initiation command include, but are not limited to, enabling operation of one or more of the machinery and/or vehicle comprising programmable logic controllers, disabling operation thereof, and transmitting warnings to individuals or organizations in communication with the system of the present invention.

Although the actuator may be activated by simply depressing/triggering a button or switch located on the actuator, so as to send a signal or command to the actuator computer processing means, in a preferred embodiment, initiation of the communication of a signal or command is carried out by one or more of the sensors/detectors mentioned above, independent of conscious human action. For example, the actuator may contain a motion sensor that becomes activated by a lack of motion while in use, or excessive motion while in use.

Specifically, if the actuator computer processing means, receiving data from the motion detector, determines that the actuator has been sedate (not moved) for a specified period of time during specified hours, the actuator is operable to send a warning signal to the base station computer processing means of the system of the present invention. The system may then automatically trigger an event or warning specified by that inactivity. For example, the system could trigger a "Man Down" alarm, deactivate machinery associated with the user of the actuator, or simply notify a foreman associated with the specific actuator that the user associated with that actuator has not moved for a specified time period.

The air speed indicator is capable of measuring the velocity (via air speed) of travel of the actuator, and thus the user. Inclusion of the air speed detector on the remote actuator is preferred in situations in which velocity of the user is controlled by certifications and/or qualifications. For example, in warehouse applications, operation of a forklift requires training and certification prior to same. However, frequently, uncertified workers operate forklifts, placing others in danger and potentially causing the company liability for damages resulting from accidents.

When data is received from the actuator comprising the air speed indicator, which indicates that a worker whose MAC address is associated with lack of certification to operate a forklift is exceeding a predetermined velocity, the base station computer processing means is operable to initiate an appropriate action. For example, the base station computer processing means may be operable to send a warning to the warehouse foreman, so that the foreman can take action. Alternatively, the base station computer processing means may be operable to turn on or off machinery and/or vehicles comprising programmable logic controllers in close proximity or associated with the MAC address of the RFID of the actuator, depending upon the data received from the air speed indicator.

The light sensor (light meter) is operable for detecting the presence and/or level of light incident on the sensor. The light sensor may be configured to detect light within specified regions, depending upon the application. For example, the light sensor may be capable of detecting infrared light, visible light, etc. The actuator computer application program product may be operable to initiate an action initiation command from the user alert initiation means to the active RFID tag if no light is sensed/present for a preassigned period of time. Thus, the remote actuator may be programmed to initiate any desired action based on data communicated by the light sensor.

In addition, the actuator may comprise various other types of sensors/detectors, and initiate predetermined actions based on data received therefrom. For example, a heat sensor may be provided on the remote actuator, functional not just to determine temperature, but to transmit a data identifier to the actuator computer processing means of the remote actuator when a specified pre-programmed time limit has been reached at a certain temperature. Other types of sensors/detectors that may be provided on the remote actuator include radioactivity detector/sensors, chemical sensors, physiological sensors, bioagent detectors, altimeters, air speed indicators, etc. Although obviously for a different application than the heat sensor, such sensors/detectors also function so as initiate a predetermined action based on physical/biological parameters sensed/detected by same.

The base station computer processing means may be programmed to initiate a warning to the warehouse manager when data is received from remote actuator, containing the air speed indicator, which indicates that a worker whose MAC address is associated with lack of certification to operate a forklift is exceeding a predetermined velocity. However, there is no limitation to the actions capable of being initiated by base station computer processing means based on the data received thereby. For example, if forklifts are in communication with the system of the present invention, the base station computer processing means may be operable to cease operation of all forklifts detected in close proximity to the uncertified user.

The actuator may contain an altimeter, capable of detecting the altitude of the remote actuator, and communicating data concerning same to the actuator computer processing means, for communication to the base station computer processing means. Data received from the altimeter may be utilized by the base station computer processing means to determine, for example, whether individuals associated with the active RFID tag are performing an unauthorized function, or are in an unauthorized location. Specifically, the base station computer processing means, in conjunction with the base station computer application program product, receives altimeter data from the remote actuator, queries a database containing data concerning qualifications/certifications of the user of the RFID tag associated with the actuator, and determines whether the user individuals, who may be climbing up a high ladder or is in a forklift basket cages for work high in the air, is doing so without permission. The base station computer processing means will then select the appropriate action initiation command based on the determination thereof.

The biometric sensor allows for direct association of the actuator to the user. In particular, the biometric sensor is operable to measure biometrics of the user, such as fingerprint, vein patterns of the eye, etc. The biometric sensor then communicates this biometric data to the actuator computer processing means, which then communicates same to the central server (base station computer processing means). The base station computer processing means then queries the cache of action initiation data. Direct biometric association to the actuator may require external power during the moment of association if the biometric is built into the remote actuator.

A user may be required to biometrically associate with the base station computer processing means, or directly biometrically associate with the actuator, thereby allowing the system to unilaterally identify the person with that actuator. For example, a user may log into the base station computer application or register as an active user. Then, the user may lay his actuator on an RFID near field antenna, so as to read the RFID on the actuator and associate it with the user.

The actuator is utilized in an environment that requires detection of sound data, as mentioned above, the actuator may comprise an acoustic detector. The acoustic detector is operable to receive and record streaming audio data for transmission, and transmit the streaming audio data to the actuator computer processing means. The actuator computer processing means then transmits the streaming audio data to the centralized server.

In addition, the actuator having an acoustic detector may be configured to be operable to detect and transmit identifiers associated with specific noises. For instance, specific drivers of forklifts may change gear much more frequently than others. The actuator computer processing means can be programmed to detect specified sound frequencies created by the changing of gears, interpret the gear change sound frequency as a unique variable, and transmits same as a unique value, such as a binary, aski, Boolean value, etc., and transmit same to the central base station. The base station then queries the cache of action initiation data, and determines an appropriate action. For example, a warning concerning excessive gear changing by the user associated with a particular actuator may be transmitted to the warehouse foreman.

In a sixth embodiment of the present invention, the wireless protocol-based action-oriented system of the first embodiment above is provided, wherein the actuator further comprises a housing formed of a reactive polymer, which changes color upon exposure to physical changes.

Specifically, the housing may be formed of a polydiacetylene-containing polymer which undergoes a visible color change upon exposure to a variety of elements, including ultraviolet light (UV) or physical stress. In such an embodiment, the actuator housing acts as a sensor/detector, so as to be operable to warn the user of undesirable exposure (or lack thereof) to UV light, or other physical stresses which affect the housing polymer.

In a seventh embodiment of the present invention, the wireless protocol-based action-oriented system of the first embodiment above is provided, wherein the actuator further comprises one or more light emitting diodes (LED's) disposed thereon.

In a eighth embodiment of the present invention, the wireless protocol-based action-oriented system of the first embodiment above is provided, wherein the actuator further comprises a piezoelectrically rechargeable power source.

In a ninth embodiment of the present invention, the wireless protocol-based action-oriented system of the first embodiment above is provided, wherein the system comprises a power source operable to remotely power the active RFID tag of the actuator.

In such an embodiment, the power source is the base station computer processing means, a remote power source in communication therewith, or an electronic device not in communication with the system of the present invention. The active RFID tag of the actuator, when placed in the vicinity of, but not in direct contact with, the remote power source, is powered via heat energy or permanent magnet-excited transverse flux electrical energy emanating from the remote power source. Thus, the actuator would never need to be charged.

In a tenth embodiment of the present invention, the wireless protocol-based action-oriented system of the first embodiment above is provided, wherein the actuator further comprises one or more light emitting diodes (LED's).

The remote actuator may have a series of light emitting diodes disposed thereon for display that represent the time constraint chosen by the application administrator. This application requires the remote actuator device to be pressed at the end of a determined event by the operator. The LED's displayed in, for example, a circle pattern, light up as the preprogrammed time constraint is nearing completion.

In an eleventh embodiment of the present invention, the system of the first embodiment above is provided, wherein the associated machinery and/or vehicles comprising programmable logic control comprise:

(a) a unit computer processing means;

(b) a unit computer storage means in communication with the unit computer processing means; and (c) a unit station wireless communication means which is in communication with the unit computer processing means, and which is capable of enabling wireless communication of the unit computer processing means with the base station server; and (d) a unit computer application program product operable to run on the unit computer processing means, in conjunction with a conventional operating system, comprising:

(1) computer application program code operable to enable reception of the action initiation command from the base station computer processing means;

(2) computer application program code operable to determine the status of the unit at the time of receipt of the action initiation command;

(3) computer application program code operable to enable the unit computer processing means to transmit an execution order of the action initiation command, based on the determined status of the unit at the time of receipt of the action initiation command, to the unit; and (4) computer application program code operable to enable the unit computer processing means to communicate, via an associated access point, the status of the unit after execution of the action initiation command.

As discussed above, the interne protocol-based action orientated actuator (i.e., actuator), which may be worn by a user, may be activated by the user to wirelessly communicate a signal to a wireless network subsequently initiating an assigned action stored on the central server. The system includes a computer software program product (application) located on a server, which links the remote actuator through a wireless network to communicate with a corresponding machine or vehicle to initiate an action thereby. Further, the actuator may contain a barcode, or a unique identification number, that is initially assigned by the application on the server to subsequent action on a third party device. For example, an actuator may be assigned on the server to deactivate a certain machine.

The computer application program product may comprise computer application program code operable to associate the barcode, or unique identification number, of each individual actuator with the active RFID tag of each individual actuator. Thus, the actuator, in conjunction with the system and corresponding computer program product, allows a user to have the ability to immediately initiate a remote action, such as the halting of operation of industrial equipment or vehicles in communication with the system.

DETAILED DESCRIPTION OF THE INVENTION

Figure 1:
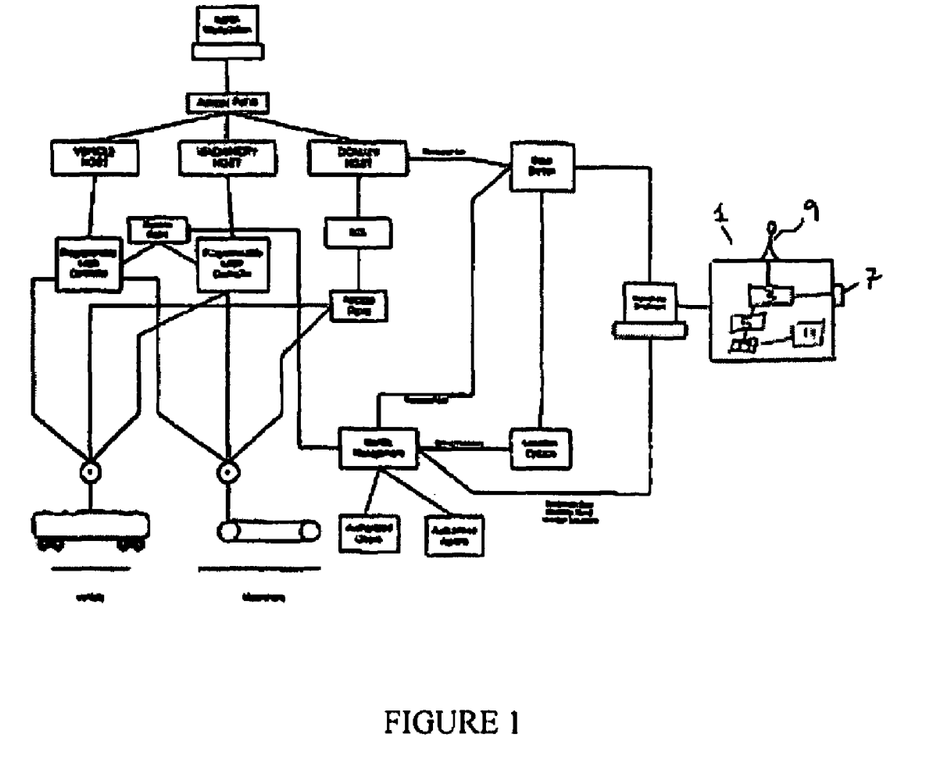
FIG. 1 is a box diagram of the wireless internet protocol-based action-oriented system of the present invention, illustrating each component of the system, and the system of communication therebetween.

As illustrated in FIG. 1, the present invention provides a wireless internet protocol-based action-oriented system comprising wireless internet protocol-based action-oriented system, as described in the first embodiment above. Generally, a wireless network, such as a TCP/IP Wireless 802.11b network, is required for minimum use capability of the system of the present invention, but any conventional wireless network standard may be utilized.

Figure 2:
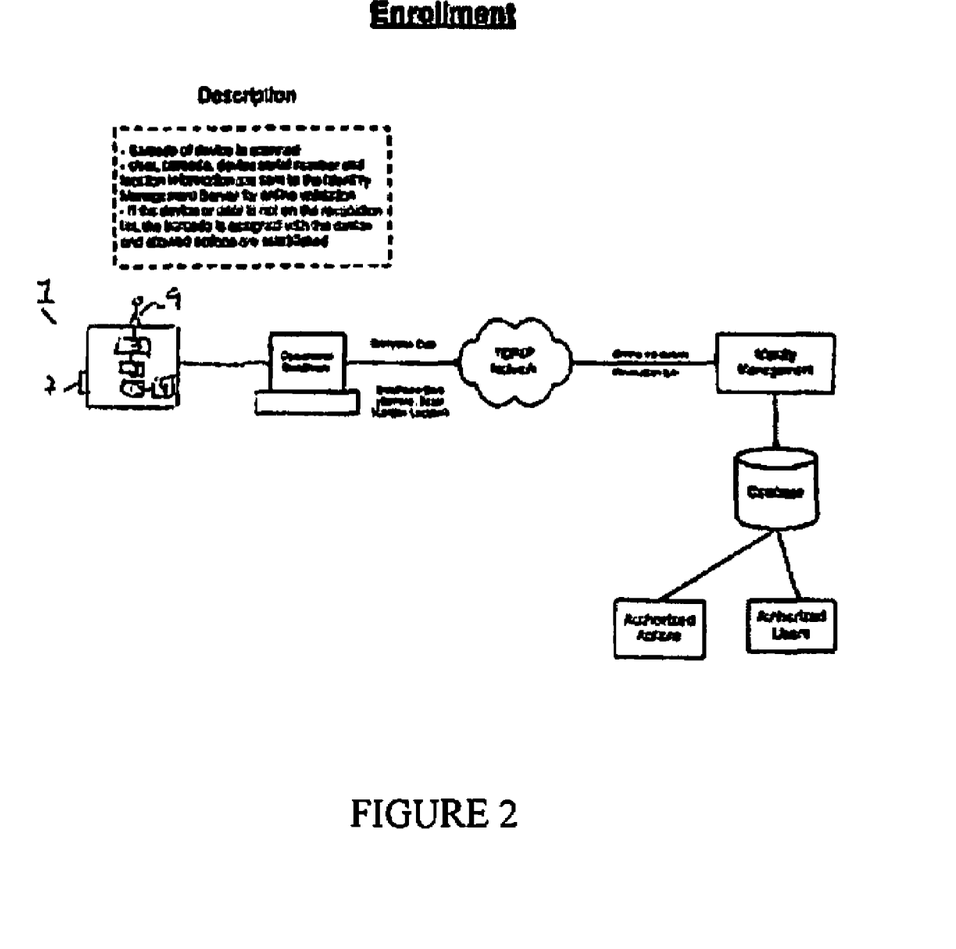
FIG. 2 is a box diagram, illustrating the connectivity of the actuators to the system, and the interrelationship of the system components.

As illustrated in FIGS. 1 and 2, the system comprises one or more internet protocol-based action orientated actuators 1 (i.e., actuators). Each actuator 1 has an active RFID tag 3 operable to transmit a MAC address on a wireless network, an actuator computer processing means 5 in communication with the active RFID tag 3, and a user alert initiation means 7 in communication with the active RFID tag 3 and the actuator computer processing means 5, so as to allow communication of an action initiation command by a user to the actuator computer processing means 5. In particular, the actuator 1 of the system, generally being a MAC (Media Access Control) addressable device, is comprised of an active RFID (radio frequency identification) tag and a user alert initiation means, such as a button, in communication with the active RFID tag, so as to allow the user to send an action initiation command to the actuator computer processing means by simply depressing the button.

The actuator further comprises an actuator wireless communication means, such as an Ethernet card, in communication with the RFID tag. For example, in practice, the actuator is comprised of an RFID tag, a TCP/IP ethernet Chip, ASIC, static RAM, generally a plastic or polymer housing, and a button or switch as the action initiation means. The actuator has both transmit and receive functions. The actuator wireless communication means allows the RFID tag to communicate with the closest system access point, generally a wireless network bridge device, to the actuator on the LAN.

Further, the actuator has an actuator wireless communication means 9 in communication with the active RFID tag 3, and a trigger 13 to initiate communications with the actuator based on detected/measured physical data and/or biological parameters detected/measured by one or more sensors/detectors 11 provided on the actuator 1. Preferably, the actuators also comprise a barcode or a unique identification number.

The sensors/detectors 11 detect/measure physical data and/or biological parameters. The sensors/detectors 11 may be a motion detector, infrared (IR) distance sensor, light sensor (light meter), radioactivity detector/sensor, chemical sensor, physiological parameter sensor, biometric sensor, bioagent detectors, altimeter, air speed indicator, air pressure sensor, olfactory sensor, and/or an acoustic detector. The sensors/detectors 11 are operable to communicate physical and/or biological data to the actuator computer processing means 5, which then communicates said data (or variations thereof) to the base station computer processing means. The base station computer processing means is operable to initiate a warning or communication to preselected individuals, and/or communicate commands to machinery associated with the actuator from which the data was received, based on the data communicated from the sensors/detectors.

Importantly, when utilizing any sensor/detector provided by the present invention, the base station computer processing means receives data from the actuator provided by the sensor/detector, and then queries the cache of action initiation data to determine an appropriate response (such as an action initiation command, or the decision to take no action) based on the data received from the sensor/detector. Exemplary action initiation command include, but are not limited to, enabling operation of one or more of the machinery and/or vehicle comprising programmable logic controllers, disabling operation thereof, and transmitting warnings to individuals or organizations in communication with the system of the present invention.

Although the actuator may be activated by simply depressing/triggering a button or switch located on the actuator, so as to send a signal or command to the actuator computer processing means, in a preferred embodiment, initiation of the communication of a signal or command is carried out by one or more of the sensors/detectors mentioned above, independent of conscious human action. For example, the actuator may contain a motion sensor that becomes activated by a lack of motion while in use, or excessive motion while in use.

Specifically, if the actuator computer processing means, receiving data from the motion detector, determines that the actuator has been sedate (not moved) for a specified period of time during specified hours, the actuator is operable to send a warning signal to the base station computer processing means of the system of the present invention. The system may then automatically trigger an event or warning specified by that inactivity. For example, the system could trigger a "Man Down" alarm, deactivate machinery associated with the user of the actuator, or simply notify a foreman associated with the specific actuator that the user associated with that actuator has not moved for a specified time period.

The air speed indicator is capable of measuring the velocity (via air speed) of travel of the actuator, and thus the user. Inclusion of the air speed detector on the remote actuator is preferred in situations in which velocity of the user is controlled by certifications and/or qualifications. For example, in warehouse applications, operation of a forklift requires training and certification prior to same. However, frequently, uncertified workers operate forklifts, placing others in danger and potentially causing the company liability for damages resulting from accidents.

When data is received from the actuator comprising the air speed indicator, which indicates that a worker whose MAC address is associated with lack of certification to operate a forklift is exceeding a predetermined velocity, the base station computer processing means is operable to initiate an appropriate action. For example, the base station computer processing means may be operable to send a warning to the warehouse foreman, so that the foreman can take action. Alternatively, the base station computer processing means may be operable to turn on or off machinery and/or vehicles comprising programmable logic controllers in close proximity or associated with the MAC address of the RFID of the actuator, depending upon the data received from the air speed indicator.

The light sensor (light meter) is operable for detecting the presence and/or level of light incident on the sensor. The light sensor may be configured to detect light within specified regions, depending upon the application. For example, the light sensor may be capable of detecting infrared light, visible light, etc. The actuator computer application program product may be operable to initiate an action initiation command from the user alert initiation means to the active RFID tag if no light is sensed/present for a preassigned period of time. Thus, the remote actuator may be programmed to initiate any desired action based on data communicated by the light sensor.

In addition, the actuator may comprise various other types of sensors/detectors, and initiate predetermined actions based on data received therefrom. For example, a heat sensor may be provided on the remote actuator, functional not just to determine temperature, but to transmit a data identifier to the actuator computer processing means of the remote actuator when a specified pre-programmed time limit has been reached at a certain temperature. Other types of sensors/detectors that may be provided on the remote actuator include radioactivity detector/sensors, chemical sensors, physiological sensors, bioagent detectors, altimeters, air speed indicators, etc. Although obviously for a different application than the heat sensor, such sensors/detectors also function so as initiate a predetermined action based on physical/biological parameters sensed/detected by same.

The actuator may contain an altimeter, capable of detecting the altitude of the remote actuator, and communicating data concerning same to the actuator computer processing means, for communication to the base station computer processing means. Data received from the altimeter may be utilized by the base station computer processing means to determine, for example, whether individuals associated with the active RFID tag are performing an unauthorized function, or are in an unauthorized location. Specifically, the base station computer processing means, in conjunction with the base station computer application program product, receives altimeter data from the remote actuator, queries a database containing data concerning qualifications/certifications of the user of the RFID tag associated therewith concerning, for example, whether those same individuals may be getting on long ladder's or forklift basket cages for work high in the air without permission.

The biometric sensor allows for direct association of the actuator to the user. In particular, the biometric sensor is operable to measure biometrics of the user, such as fingerprint, vein patterns of the eye, etc. The biometric sensor then communicates this biometric data to the actuator computer processing means, which then communicates same to the central server (base station computer processing means). The base station computer processing means then queries the cache of action initiation data. Direct biometric association to the actuator may require external power during the moment of association if the biometric is built into the remote actuator.

A user may be required to biometrically associate with the base station computer processing means, or directly biometrically associate with the actuator, thereby allowing the system to unilaterally identify the person with that actuator. For example, a user may log into the base station computer application or register as an active user. Then, the user may lay his actuator on an RFID near field antenna, so as to read the RFID on the actuator and associate it with the user.

When the actuator is utilized in an environment that requires detection of sound data, as mentioned above, the actuator may comprise an acoustic detector. The acoustic detector is operable to receive and record streaming audio data for transmission, and transmit the streaming audio data to the actuator computer processing means. The actuator computer processing means then transmits the streaming audio data to the centralized server.

In addition, the actuator having an acoustic detector may be configured to be operable to detect and transmit identifiers associated with specific noises. For instance, specific drivers of forklifts may change gear much more frequently than others. The actuator computer processing means can be programmed to detect specified sound frequencies created by the changing of gears, interpret the gear change sound frequency as a Boolean value, and transmit that value to the central base station. The base station then queries the cache of action initiation data, and determine an appropriate action. For example, a warning concerning excessive gear changing by the user associated with a particular actuator may be transmitted to the warehouse foreman.

The actuator may be auto-programmable via passive RFID or near field RFID technology. In particular, the remote actuator may be quickly associated to an asset (such as machinery) or person by utilizing near field or contact association. This is achieved by first associating a barcode with the active RFID contained in the actuator, and scanning the barcode associated with the active RFID tag contained within the actuator, so as to input the barcode and associated active RFID into the base station computer storage means, as described in the third embodiment above. Then, the barcode and active RFID to a user via the base station computer processing means.

In contrast to the embodiments described above for transmitting data to the system, the actuator may have a housing formed of a reactive polymer, which changes color upon exposure to physical changes, so as to alert the user of the actuator of certain situations. Specifically, the housing may be formed of a polydiacetylene-containing polymer which undergoes a visible color change upon exposure to a variety of elements, including ultraviolet light (UV) or physical stress. In such an embodiment, the actuator housing acts as a sensor/detector, so as to be operable to warn the user of undesirable exposure (or lack thereof) to UV light, or other physical stresses which affect the housing polymer.

In a preferred embodiment, the actuator has one or more light emitting diodes (LED's) disposed thereon. In practice, the actuator has a series of light emitting diodes disposed thereon for display to a user, that represent the time constraint chosen by the application administrator. This application requires the remote actuator device to be pressed at the end of a determined event by the operator. The LED's displayed in, for example, a circle pattern, light up as the preprogrammed time constraint is nearing completion.

With regards to power sources, the actuator may have a traditional power source, such as a disposable or rechargeable battery. However, preferably, the actuator is powered by a piezoelectrically rechargeable power source, which negates the need for recharging, but rather depends on simple motion of the actuator.

In another preferred embodiment, the power source for the actuator is remote therefrom, and is operable to remotely power the active RFID tag of the actuator. In such an embodiment, the power source is the base station computer processing means, a remote power source in communication therewith, or an electronic device not in communication with the system of the present invention. The active RFID tag of the actuator, when placed in the vicinity of, but not in direct contact with, the remote power source, is powered via heat energy or permanent magnet-excited transverse flux electrical energy emanating from the remote power source. Thus, the actuator would never need to be charged.

The system further comprises one or system access points, which are in wireless communication with one or more of the actuators. Each of said access points comprises an access point computer processing means, such as a microprocessor, and an access point wireless communication means, such as an ethernet chip. The various access points on the LAN communicate with one or more location-based addressable IP central base station servers.

The access points are in wireless communication, via wireless LAN, with one or more location-based addressable IP central base station servers. The base station servers each comprise a base station computer processing means, such as a conventional microprocessor. Generally, an IBM or compatible PC workstation running a Microsoft Windows or LINUX operating system is required for minimum use capability of the system of the present invention, but any conventional CPU may be utilized. A computer storage means is in communication with the base station computer processing means, and a base station wireless communication means, such as an Ethernet chip, which is in communication with the base station computer processing means and which enables wireless communication of the base station server with one or more of the access points and associated machinery and/or vehicles.

The base station computer processing means may be programmed to initiate a warning to the warehouse manager when data is received from remote actuator, containing the air speed indicator, which indicates that a worker whose MAC address is associated with lack of certification to operate a forklift is exceeding a predetermined velocity. However, there is no limitation to the actions capable of being initiated by base station computer processing means based on the data received thereby. For example, if forklifts are in communication with the system of the present invention, the base station computer processing means may be operable to cease operation of all forklifts detected in close proximity to the uncertified user.

The base station servers further comprise a computer storage means in communication with the base station computer processing means, and a base station wireless communication means which is in communication with the base station computer processing means, and which is capable of enabling wireless communication of the base station server with one or more of the access points and associated machinery and/or vehicles comprising programmable logic controllers. The wireless communication means may be any conventional wireless LAN system.

The actuator is provided with an actuator computer application program product operable to run on the actuator computer processing means, in conjunction with a conventional operating system, to enable the actuator to communicate with the base station server. The actuator computer application program product comprises computer application program code operable to communicate an action initiation command from the user alert initiation means or sensors/detectors to the active RFID tag. The actuator computer application program code further has computer application program code operable to enable the active RFID tag to communicate an action initiation command to the base station computer processing means by transmitting a Boolean value to the base station.

Likewise, the base station server is provided with a base station computer application program product operable to run on the base station computer processing means, in conjunction with a conventional operating system. The base station computer application program product comprises computer application program code operable to enable reception of the action initiation command, or any data, received from the access point associated with the user's actuator, and transmit same to the base station computer processing means. Further, computer application program code is provided which is operable to enable the base station computer processing means to determine the identification of the active RFID tag of the actuator and/or physical location of the actuator, based on the location of the actuator on the wireless LAN.

The base station computer application program product further comprises computer application program code operable to determine machinery and/or vehicles associated with the actuator, based on the identified active RFID tag and/or the determined physical location of the actuator, and computer application program code operable to query a cache of action initiation data, stored on the base station computer storage means, corresponding to the machinery and/or vehicles associated with the active RFID tag or the location of the actuator, to determine one or more appropriate action initiation commands associated with the determined associated machinery and/or vehicles.

In addition, the base station computer application program product comprises computer application program code operable to enable the base station computer processing means to communicate, via the base station wireless communication means, the action initiation commands to the associated machinery and/or vehicles, and computer application program code operable to provide a user interface means to enable observation of system conditions, and select active controls (actions to be initiated) for specific actuators.

A computer application program product is provided as part of the system of the present invention, including an actuator computer application program product operable to run on the RFID tag, and a base station computer application program product operable to run on the base station computer processing means. Further, a unit computer application program product operable to run on the unit computer processing means of the associated machinery and/or vehicles comprising programmable logic controllers is provided. These computer application program product elements, designed to run on conventional operating systems, allow the actuator, access points, base station server and associated machinery and/or vehicles to interface and communicate with each other.

The actuator computer application program product comprises computer application program code operable to communicate an action initiation command (i.e., a depressing of the button on the actuator) to the RFID tag, and computer application program code operable to enable the RFID tag to relay that action initiation command to the base station computer processing means, via the access points of the system, means via the wireless LAN.

In general, when receiving an action initiation command from an actuator, the base station computer application program product identified by the actuator's RFID tag queries a database to determine the active controls (actions to be taken) that correspond to the identified RFID tag. The base station then sends action commands to the machinery and/or vehicles associated with the determined active controls.

The system supervisor or other system management personnel may, via the user interface of the first embodiment herein, set the active controls associated with each particular actuator. For example, each RFID tag can be assigned to a person, and also assigned to a group of objects, such as machinery and/or vehicles. If the RFID tag is depressed or activated by the user, the RFID tag responds by transmitting a Boolean value to the base station server. The base station server then receives a "yes" or "no" signal from the RFID tag, references which object(s) the tag is associated with on the server, and performs the necessary actions defined by the active controls. The actions may include, for example, sounding of the horn, turning on a light that requests more parts for the Kanban, automatically shutting down specifically assigned conveyors, etc.

The remote actuators, which may be worn or carried by a user, may be activated by the user or one or more of the sensors/detectors disposed thereon to wirelessly communicate to the base station server via the wireless network, subsequently initiating an assigned action stored on the central server. As described above, and as illustrated in FIG. 2, the system includes a computer software program product (application) located on a server, which links the remote actuator through a wireless network to communicate with a corresponding machine or vehicle, allowing the actuator to initiate a preassigned action by the machine or vehicle. Further, the actuator may contain a barcode, or a unique identification number, that is initially assigned by the application on the server to subsequent action on a third party device. For example, an actuator may be assigned on the server to deactivate a certain machine.

The computer application program product may comprise computer application program code operable to associate the barcode, or unique identification number, of each individual remote actuator with the active RFID tag of each individual remote actuator. Thus, the actuator, in conjunction with the system and corresponding computer program product, allows a user to have the ability to immediately initiate a remote action, such as the halting of operation of industrial equipment or vehicles in communication with the system.

The remote actuator may be activated by a variety of actions, as well as or in addition to inactions. For example, the remote actuator may be activated by depression of a button located on the remote actuator. Additionally or alternatively, the actuator may contain a switch that becomes activated by a lack of motion while in use. For example, the actuator can be configured such that if the actuator becomes sedate for a specified period of time during specified hours, the motion sensor disposed thereon will transmit data concerning same to the system, which will automatically trigger an event specified by that inactivity. This action could, for instance, trigger a "Man Down" alarm, or just notify a foreman.

In practice, once the button (user alert initiation means) is pressed/activated by the user, or a sensor/detector transmits data, the MAC addressable actuator device wirelessly transmits a pre-set string of action initiation information, along with a character code and MAC address, by transmitting a Boolean value to the closest access point on the LAN, as illustrated in FIG. 1. This wireless transmission will continuously repeat this string of characters until the actuator is reset by the base station server. The signal (comprised of an action initiation command) is transmitted through the wireless LAN to an Access Point or Access Port, which then transmits the packet of characters to a specified server.

The base station server then performs the calculations defined in the base station server computer application program product description above, and thus transmits an action initiation command to the determined associated machinery and/or vehicles (i.e., those associated with the active controls corresponding to the specific RFID tag). Essentially, the base station server interprets the information received from the actuator via the access point, and wirelessly activates a corresponding Programmable Logic Controller (PLC) in communication with the corresponding machinery and/or vehicles, that then terminates operation thereof, disables the machinery or vehicle, or sends a warning or report to designated individuals, organizations or devices.

Further, the system may also comprise associated machinery and/or vehicle (units), wherein the units have a unit computer processing means, a unit computer storage means in communication with the unit computer processing means, and a unit station wireless communication means which is in communication with the unit computer processing means, and which is capable of enabling wireless communication of the unit computer processing means with the base station server. In particular, the associated machinery and/or vehicles comprise programmable logic control, which comprises a unit computer processing means, a unit computer storage means in communication with the unit computer processing means, and a unit station wireless communication means which is in communication with the unit computer processing means, and which is capable of enabling wireless communication of the unit computer processing means with the base station server.

In addition, unit computer application program product, operable to run on the unit computer processing means, in conjunction with a conventional operating system, is provided to enable the unit to communicate with the system, including receiving action initiation commands from the base station server or access points, determining the status of the unit, executing the action initiation commands received from the system, and transmitting the status of the unit to the system. The unit computer application program product comprises computer application program code operable to enable reception of the action initiation command from the base station computer processing means, computer application program code operable to determine the status of the unit at the time of receipt of the action initiation command, computer application program code operable to enable the unit computer processing means to transmit an execution order of the action initiation command, based on the determined status of the unit at the time of receipt of the action initiation command, to the unit, and computer application program code operable to enable the unit computer processing means to communicate, via an associated access point, the status of the unit after execution of the action initiation command.

The system of the present invention is very easy to implement, as the wearable actuator devices can be distributed to staff of a particular facility that is already designed to support a wireless network for the entire establishment. The devices enable any individual that witnesses an emergency event, or spots irregularities that could be dangerous, to immediately notify the system electronically. Further, the actuator device can be configured to support the control of location based Programmable Logic Controller (PLC) for the control of specific equipment. Thus, emergency stoppage of a particular accident or security violation in a given area can be expedited by the implementation of the system of the present invention.

For example, an individual that is working on an assembly line may notice another worker getting caught in a conveyor belt, and find it much more responsive to press a button that is worn on his belt then having to run over to an area that has a work stop device, such as a "kanban", mounted to it. Additionally, a person caught in a conveyor belt (or other such thing) may not be able to physically actuate a pull cord/push button that is physically mounted on the stationary machinery, but could reach the actuator worn on or carried by the user. Further applications of the present invention include security in a bank, mall or any public "wireless" arena that could utilize a single action notification system to alert of an event As discussed above, the internet protocol-based action orientated actuator (i.e., actuator), which may be worn by a user, may be activated by the user to wirelessly communicate a signal to a wireless network subsequently initiating an assigned action stored on the central server. The system includes a computer software program product (application) located on a server, which links the remote actuator through a wireless network to communicate with a corresponding machine or vehicle to initiate an action thereby. Further, the actuator may contain a barcode, or a unique identification number, that is initially assigned by the application on the server to subsequent action on a third party device. For example, an actuator may be assigned on the server to deactivate a certain machine.

The computer application program product may comprise computer application program code operable to associate the barcode, or unique identification number, of each individual actuator with the active RFID tag of each individual actuator. Thus, the actuator, in conjunction with the system and corresponding computer program product, allows a user to have the ability to immediately initiate a remote action, such as the halting of operation of industrial equipment or vehicles in communication with the system.

Although specific embodiments of the present invention have been disclosed herein, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A wireless internet protocol-based action-oriented system is provided, comprising:
    (1) one or more internet protocol-based action orientated actuators, each actuator comprising:
        (a) an active RFID tag operable to transmit a MAC address on a wireless network;
        (b) an actuator computer processing means in communication with the active RFID tag;
        (b) a user alert initiation means in communication with the active RFID tag and the actuator computer processing means, so as to allow communication of an action initiation command by a user to the actuator computer processing means;
        (c) an actuator wireless communication means in communication with the active RFID tag;
        (d) one or more sensors/detectors operable to detect/measure physical and/or biological parameters; and
        (e) a trigger to initiate communications with the actuator based on the detected/measured physical and/or biological parameters, so as to allow communication of sensed data by the detector or wireless communication means;
    (2) one or more system access points in wireless communication with one or more of the actuators, each of said access points comprising:
        (a) an access point computer processing means;
        (b) an access point wireless communication means;
    (3) one or more location-based addressable IP central base stations having servers, each of said base stations in communication, via wireless LAN, with one or more of the access points, each of said central base stations having servers comprising:
  (a) a base station computer processing means;
  (b) a computer storage means in communication with the base station computer processing means; and
  (c) a base station wireless communication means which is in communication with the base station computer processing means, and which is capable of enabling wireless communication of the base station server with one or more of the access points and associated machinery and/or vehicles comprising programmable logic controllers with the machinery and/or vehicle associated with a corresponding RFID tag or a location of an actuator;
(4) an actuator computer application program product operable to run on the actuator computer processing means, in conjunction with a conventional operating system, comprising:
  (a) computer application program code operable to communicate an action initiation command from the user alert initiation means and the sensed data to the active RFID tag; and
  (b) computer application program code operable to enable the active RFID tag to communicate an action initiation command and the sensed data to the base station computer processing means by transmitting a Boolean value to a base station via a system access point;
(5) a base station computer application program product operable to run on the base station computer processing means, in conjunction with a conventional operating system, comprising:
  (a) computer application program code operable to enable reception of the action initiation command and the sensed data from the access point associated with the user's actuator, and transmit same to the base station computer processing means;
  (b) computer application program code operable to enable the base station computer processing means to determine the identification of the active RFID tag of the actuator and/or physical location of the actuator, based on the location of the actuator on the wireless LAN;
  (c) computer application program code operable to determine associated machinery and/or vehicles, based on the identified active RFID tag attached to the actuator and user of the actuator and/or the determined physical location of the actuator associated with the user of the actuator;
  (d) computer application program code operable to query a cache of action initiation data, stored on the base station computer storage means, corresponding to the machinery and/or vehicles associated with the active RFID tag or the location of the actuator, to determine one or more appropriate action initiation commands associated with the determined associated machinery and/or vehicles;
  (e) computer application program code operable to enable the base station computer processing means to communicate, via the base station wireless communication means, the action initiation commands to the associated machinery and/or vehicles; and
  (f) computer application program code operable to provide a user interface means to enable observation of system conditions, and select active controls (actions to be initiated) for specific actuators.

2. The wireless internet protocol-based action-oriented system of claim 1, wherein:
  the actuator further comprises a barcode or a unique identification number, and
  the base station computer application program product further comprises computer application program code operable to associate the barcode or unique identification number of each actuator with the active RFID tag of each actuator.

3. The wireless internet protocol-based action-oriented system of claim 2, further comprising:
  a barcode scanner in communication with the base station computer processing means, the barcode scanner being operable to input barcode data associated with the barcode of each individual actuator into the base station computer program product.

4. The wireless internet protocol-based action-oriented system of claim 2, wherein the actuator is auto-programmable via passive RFID or near field RFID technology.

5. The wireless internet protocol-based action-oriented system of claim 1, wherein the sensors/detectors comprise one or more of a motion detector, infrared (IR) distance sensor, light sensor (light meter), radioactivity detector/sensor, chemical sensor, physiological parameter sensor, biometric sensor, bioagent detectors, altimeter, air speed indicator, air pressure sensor, olfactory sensor, and acoustic detector.

6. The wireless protocol-based action-oriented system of claim 1, wherein the actuator further comprises a housing formed of a reactive polymer, which changes color upon exposure to physical changes.

7. The wireless protocol-based action-oriented system of claim 6, wherein the housing is formed of p polydiactylene-containing polymer.

8. The wireless protocol-based action-oriented system of claim 1, wherein the actuator further comprises one or more light emitting diodes (LED's) disposed thereon.

9. The wireless protocol-based action-oriented system of claim 1, wherein the actuator further comprises a piezoelectrically rechargeable power source.

10. The wireless protocol-based action-oriented system of claim 1, wherein the system further comprises a power source operable to remotely power the active RFID tag of the actuator.

11. The wireless protocol-based action-oriented system of claim 1, wherein the actuator further comprises one or more light emitting diodes (LED's).

12. The wireless protocol-based action-oriented system of claim 1, wherein the associated machinery and/or vehicles comprising programmable logic control comprise:
  (a) a unit computer processing means;
  (b) a unit computer storage means in communication with the unit computer processing means; and
  (c) a unit station wireless communication means which is in communication with the unit computer processing means, and which is capable of enabling wireless communication of the unit computer processing means with the base station server; and
  (d) a unit computer application program product operable to run on the unit computer processing means, in conjunction with a conventional operating system, comprising:
    (1) computer application program code operable to enable reception of the action initiation command from the base station computer processing means;
    (2) computer application program code operable to determine the status of the unit at the time of receipt of the action initiation command;

(3) computer application program code operable to enable the unit computer processing means to transmit an execution order of the action initiation command, based on the determined status of the unit at the time of receipt of the action initiation command, to the unit; and
(4) computer application program code operable to enable the unit computer processing means to communicate, via an associated access point, the status of the unit after execution of the action initiation command.

* * * * *